United States Patent
Stumbo et al.

(10) Patent No.: US 10,248,909 B2
(45) Date of Patent: Apr. 2, 2019

(54) ASSESSMENT PERFORMANCE PREDICTION

(71) Applicant: Conduent Business Services, LLC, Dallas, TX (US)

(72) Inventors: William K. Stumbo, Fairport, NY (US); Charles D. Rizzolo, Fairport, NY (US)

(73) Assignee: Conduent Business Services, LLC, Dallas, TX (US)

( * ) Notice: Subject to any disclaimer, the term of this patent is extended or adjusted under 35 U.S.C. 154(b) by 287 days.

(21) Appl. No.: 15/000,157

(22) Filed: Jan. 19, 2016

(65) Prior Publication Data

US 2017/0206456 A1    Jul. 20, 2017

(51) Int. Cl.
  *G06N 7/00* (2006.01)
  *G09B 7/00* (2006.01)

(52) U.S. Cl.
  CPC .............. *G06N 7/005* (2013.01); *G09B 7/00* (2013.01); *Y04S 10/54* (2013.01)

(58) Field of Classification Search
  CPC . G09B 7/00; G09B 19/00; G09B 7/02; G06N 7/005; G06N 5/04; G06F 17/18
  See application file for complete search history.

(56) References Cited

U.S. PATENT DOCUMENTS

| | | | | |
|---|---|---|---|---|
| 5,059,127 A * | 10/1991 | Lewis | ............ | G09B 7/00 434/236 |
| 8,366,449 B2 * | 2/2013 | Wang | ............ | G09B 7/00 273/429 |
| 2006/0040247 A1 * | 2/2006 | Templin | ............ | G09B 7/00 434/362 |
| 2013/0157245 A1 * | 6/2013 | Basu | ............ | G09B 7/02 434/362 |
| 2014/0272889 A1 * | 9/2014 | Kulkarni | ............ | G09B 5/08 434/350 |
| 2016/0155346 A1 * | 6/2016 | Wang | ............ | G09B 19/00 434/353 |

OTHER PUBLICATIONS

Corbett, et al., "Knowledge Tracing: Modeling the Acquisition of Procedural Knowledge," User Modeling and User-Adapted Interaction, vol. 4, pp. 253-278 (1995).

* cited by examiner

*Primary Examiner* — Jerry-Daryl Fletcher
(74) *Attorney, Agent, or Firm* — Fay Sharpe LLP (57) ABSTRACT

A system and a method for estimating readiness for passing an associated summative assessment includes, after receiving test results for at least one test, generating a score $C_n$ for each concept tested on the test. Using the score, the system computes a probability of mastery $p(M_n)$ of the at least one concept and associates the probability of mastery $p(M_n)$ as a prior for updating the probability after receiving future test results. The system iteratively updates the probability of mastery $p(M_n)$ of the at least one concept after each test using for the new test score and the prior.

18 Claims, 4 Drawing Sheets

ASSESSMENT PERFORMANCE PREDICTION

BACKGROUND

The present disclosure is directed to a system and method for updating a probability of concept mastery and/or readiness before a summative assessment is administered and which particularly considers how the probability changes over time. The system finds application in school districts and school systems that can apply, inter alia, outcome-based instruction and can evaluate performance at the end of a curriculum using a standards-based test or summative assessment. However, there is no limitation made herein to the type of data sets applied to the disclosed algorithms.

Currently, many school districts and education systems ("school system") have adopted outcome-based programs ("standardized learning goals"), which focus on a concept that a student is required to master before advancing to the next topic, course or grade level. In these programs, the curriculum is developed to reach a known outcome and the success can be measured by a summative assessment, such as, for example, a standards-based test. Oftentimes, a school system operates under the guidelines of a state government, which sets the outcome (a.k.a. "standards"). The state establishes standards, develops state assessments, and rates schools based on the educational results. On a smaller, more localized scale, the school board can develop the standards and rate teachers based on the results of their students.

In other words, some school systems have created a structure of accountability based on the students' performance on the summative assessment, particularly rewarding teachers and administrators based on the results. Therefore, a market continues to develop for educational assessments which assist school systems and teachers (collectively referred to as "users") in identifying the strengths and weaknesses of the students receiving instruction. With this information, a school system can concentrate its resources on the concepts which students struggle with, thus increasing the likelihood that the students will achieve a higher score on the summative assessment.

Figure 1:
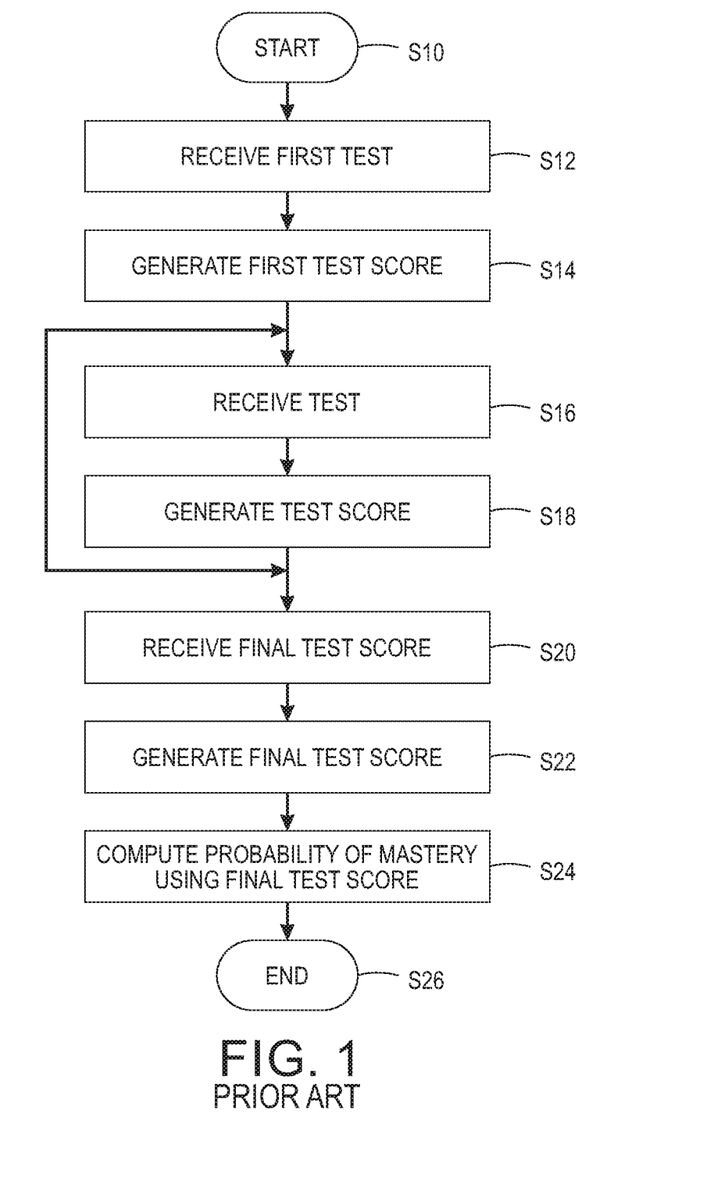
FIG. 1 shows a flow chart illustrating a method for measuring concept mastery in a classroom environment according to the PRIOR ART.

In American schools, inter alia, a number of tests are administered throughout an academic year to assess students' mastery of topics and concepts. These tests assess whether the students learned the topic after receiving classroom instruction on the topic. The test results can be used to develop targeted instruction of a concept—in the time remaining—before the summative assessment is administered. FIG. 1 is a flowchart showing the typical pattern followed in the PRIOR ART, using an academic school year as an illustrative example only. The method starts at S10. A first test (such as a formative assessment, diagnostic test, etc.) can be used to assess the student's existing knowledge before the teacher starts teaching the topic at S12. Although a score is generated for the first test at S14, this information is not considered in any future determinations regarding concept mastery. Additional tests can be administered and received throughout the year at S16, such as routine quizzes, end-of-chapter tests, quarterly exams, etc., the results of which can be used to identify any gaps in the students' knowledge at S18. Again, however, the test results are not considered in any future determinations regarding mastery. In the case of a summative assessment, a final diagnostic test can be administered and received at S20 shortly prior to the summative assessment. The results of the final test are computed at S22 and may be used to identify any problem areas that can be addressed in the remaining time. Generally at S24, the results of the final test score, only, are used to compute a probability that the student has mastered the concept and estimate the student's performance on the summative assessment, which is to follow. The method ends at S26

The summative assessment measures the mastery of a concept at a specific point in time. The score on the summative assessment is the measure of mastery. One problem with using summative assessments as an indicator of mastery is that the duration between the assessments can be long and the benefits of instruction or gaps in knowledge may not be spotted until it is too late. While the teacher can diagnose potential problems via a formative assessment or intermittent tests, such as a mid-term or final exam, the results are rarely aggregated at the classroom level to help plan the output-based curriculum. Therefore, an approach is desired for generating a prediction of mastery leading into the summative assessment.

In computer-based assessments and adaptive assessments, the exact order of questions on the assessment is known. By understanding how a student performed on one question in a known sequence, the computer-based approach can determine which question to ask next (in response to the student missing a concept-related question(s)) and whether the test should end (in response to the student answering a predetermined number of concept-related questions correctly). Bayesian techniques are often used in this scenario to update a broad measure of mastery. One problem with this approach is that it updates the probability of mastery by applying the answer of the assessment question to Bayes theorem, one answer at a time. In other words, the existing technique treats each answer independent of others and requires the probability of mastery be computed for each assessment item. An approach is desired that makes no assumptions on the order that concepts are tested on one or more assessments. An approach is desired combines all answers, particularly using a score generated for all answers covering a concept, to predict the probability of mastery while also accounting for slips and guesses.

BRIEF DESCRIPTION

A first embodiment of the disclosure relates to a method for estimating readiness for passing an associated summative assessment. The method includes receiving test results for at least one test administered before the associated summative assessment. Each test is coded with information corresponding to at least one concept being assessed by the each test. The method also includes generating a score of the at least one concept for each of the tests. Using the score generated for the first test, the method includes computing a probability of mastery of the at least one concept. The method includes associating the probability of mastery as a prior. The method further includes updating the probability of mastery of the at least one concept for at least a second test using the prior and the score corresponding to the at least a second test. The method also includes providing a user with the probability of mastery at an associated output device.

Another embodiment of the disclosure relates to a system for estimating readiness for passing an associated summative assessment. The system comprises a processor and a non-transitory computer readable memory storing instructions that are executable by the processor. The system receives test results for at least one test administered before the associated summative assessment. Each test is coded with information corresponding to at least one concept being assessed by the each test. The system generates a score of the at least one concept for each of the tests. Using the score generated for a first test, the system computes a probability of mastery of the at least one concept. The system associates the probability of mastery as a prior. Using the prior, the system updates the probability of mastery of the at least one concept for at least a second test using the score corresponding to the at least a second test. The system provides a user with the probability of mastery at an associated output device.

Another embodiment of the disclosure relates to a method for estimating readiness for passing a summative assessment. The method includes receiving test results for a test coded with information corresponding to at least one concept being tested on the associated summative assessment. The method includes generating a score corresponding to the at least one concept from the test. The method includes generating a probability of mastery of the at least one concept using the score. The current probability of mastery is computed considering a probability that the at least one concept is mastered although a question corresponding to the at least one concept was incorrectly answered on the test and a probability that the at least one concept is not mastered although the question corresponding to the at least one concept was correctly answered on the test. The method includes providing the probability of mastery to an associated user device. The method is repeated for each subsequent test received before the associated summative assessment.

DETAILED DESCRIPTION

The present disclosure relates to a system and method that measures and predicts concept mastery by leveraging the information produced each time a student is tested on a particular concept (i.e., concept, topic, or subject). The present disclosure generates a new probability of mastery—i.e., updating the probability—for each concept based on new information provided after every assessment administered to the student.

The present disclosure continually assesses a student's probability of concept mastery over time. Herein, the "probability" of concept mastery refers to an estimate corresponding to how well a student is expected to perform on the next assessment. The probability (also referred to as "level" and/or "estimate" is measured over time, and the previously computed probability (also referred to as "the prior") is applied to an algorithm with current scores from an assessment to generate an updated probability. As used herein, the "prior" is defined as an estimation of whether the student has mastered the subject computed prior to the current assessment. In time, the probability value becomes a proxy for mastery.

An "assessment" or test as used herein consists of multiple questions, some which the test-taker (hereinafter referred to as "the student" for simplicity) may answer correctly and others which the student may answer incorrectly. A formative assessment may be administered without the intention of obtaining a score. As used herein, the "formative assessment" is an initial assessment that can be used to assess concept readiness or to generate seed values. A summative assessment can include an end-of-chapter test, a final exam, an in-class quiz, a standards-based assessment (a.k.a. a state-assessment), etc. There is no limitation made herein to the type of test that makes up a summative assessment; generally, the summative assessment is used to assess a student's understanding of a concept (following instruction) at a specific point in time. For example, the summative assessment can also include graded assignments, such as homework. The only requirement is that the content of the summative assessment be tagged with the concepts being assessed.

With the movement towards standardized learning goals growing, educational assessments continue to improve. Many tests are coded with information; particularly, the questions can be tagged with information that enables users to analyze the student's response. The present disclosure uses such tests over time. More specifically, the system and method use tests that are each coded with information regarding the concept tested on each question. The score corresponding to the concept-related questions is applied to the presently disclosed algorithm along with the prior computed probability. The disclosed algorithm enables a user to determine the level of mastery, or the probability of mastery indicating how the student will perform on a future assessment.

The student's performance, regarding the score, however, can be affected by questions the student incorrectly answers by mistake or correctly guesses. The probability of mastery can be affected by an incorrect score. Accordingly, the presently disclosed algorithm accounts for false positives and false negatives. As used herein, "false positive" is defined as "the probability of guessing $p(G)$"—i.e., the probability the student passes the test, i.e., answers questions correctly, despite having not mastered the concept. In other words, the student guesses the correct answer, but may not understand the logic on how to reach the answer. As used herein, "false negative" is defined as the probability of slipping $p(S)$"—i.e., the probability the student did not pass the test, i.e., answered questions incorrectly, despite having mastered the topic. In other words, the student mistakenly answers a question(s) incorrectly despite having an understanding on how to reach the correct answer.

Figure 2:
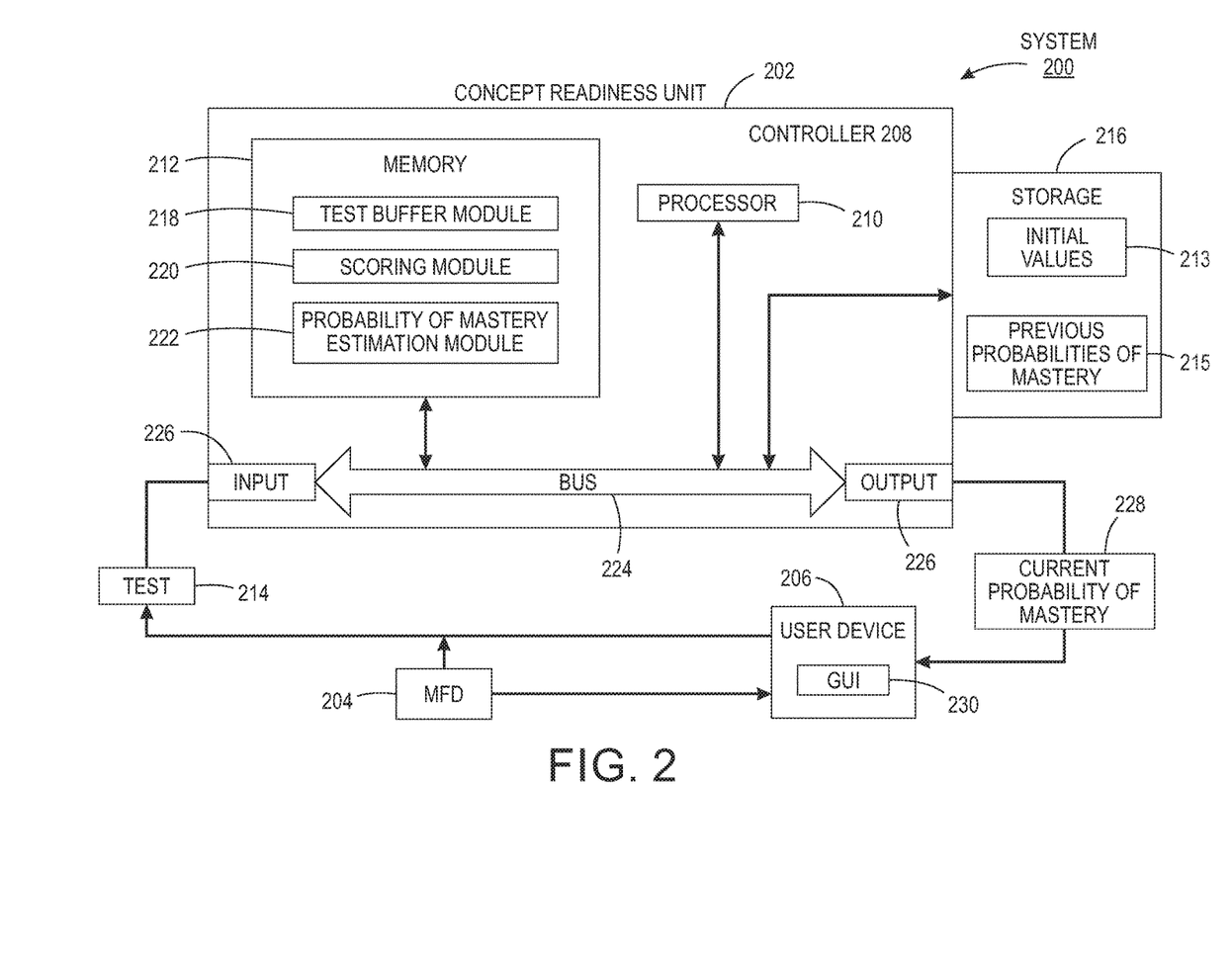
FIG. 2 is a schematic illustration of a system for estimating concept mastery according to one embodiment of the present disclosure.

FIG. 2 is a schematic illustration of a mastery estimation system 200 ("system 200") for estimate readiness for passing a summative assessment. The system 200 includes a concept readiness unit 202 and/or an MFD 204, including a scanner among other capabilities, which can be linked together by communication links, referred to herein as a network. In one embodiment, the system 200 may be in further communication with a user device 206. These components are described in greater detail below.

The concept readiness unit 202 illustrated in FIG. 2 includes a controller 208 that is part of or associated with the concept readiness unit 202. The exemplary controller 208 is adapted for controlling an analysis of test data received by the system 200 and computing a probability of mastery based on the test data, among other factors. The controller 208 includes a processor 210, which controls the overall operation of the concept readiness unit 202 by execution of processing instructions that are stored in memory 212 connected to the processor 210.

The memory 212 may represent any type of tangible computer readable medium such as random access memory (RAM), read only memory (ROM), magnetic disk or tape, optical disk, flash memory, or holographic memory. In one embodiment, the memory 212 comprises a combination of random access memory and read only memory. The digital processor 210 can be variously embodied, such as by a single-core processor, a dual-core processor (or more generally by a multiple-core processor), a digital processor and cooperating math coprocessor, a digital controller, or the like. The digital processor, in addition to controlling the operation of the concept readiness unit 202, executes instructions stored in memory 212 for performing the parts of the method outlined in FIG. 3. In some embodiments, the processor 210 and memory 212 may be combined in a single chip.

The concept readiness unit 202 may be embodied in a networked device, such as an MFD 204, although it is also contemplated that the concept readiness unit 202 may be located elsewhere on a network to which the system 200 is connected, such as on a central server, a networked computer, or the like, or distributed throughout the network or otherwise accessible thereto. In other words, the processing can be performed within the MFD 204 on site or in a central processing offline or server computer after transferring the electronic information retrieved from scanned test sheets through a network. In another embodiment, the test data 214 may be received as input from any suitable source, such as a workstation, a database, a memory storage device, such as a disk, or the like, such as, for example, the database or storage 216 connected to or in communication with the concept readiness unit 202.

The stages disclosed herein are performed by the processor 210 according to the instructions contained in the memory 212. In particular, the memory 212 stores a test buffer module 218 that receives test results and retrieves coded information corresponding to at least one question on the test; a scoring module 220 that uses the coded information and the answers included in the test results to generate a score for each concept that was tested on the test; and a probability of mastery estimation module 222 that generates a probability of mastery of the at least one concept and iteratively updates the probability until a last test is received. Embodiments are contemplated wherein these instructions can be stored in a single module or as multiple modules embodied in different devices. The modules 218-222 will be later described with reference to the exemplary method.

The software modules as used herein, are intended to encompass any collection or set of instructions executable by the concept readiness unit 202 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the concept readiness unit 202 may be all connected by a bus 224.

With continued reference to FIG. 2, the concept readiness unit 202 also includes one or more communication interfaces 226, such as network interfaces, for communicating with external devices. The communication interfaces 226 may include, for example, a modem, a router, a cable, and and/or Ethernet port, etc. The communication interfaces 226 are adapted to receive the test data 214 as input.

The concept readiness unit 202 may include one or more special purpose or general purpose computing devices, such as a server computer, controller, or any other computing device capable of executing instructions for performing the exemplary method.

FIG. 2 further illustrates the concept readiness unit 202 connected to the MFD 204, including a scanner, for capturing and/or providing the test—i.e., answer—data 214 in electronic format. The test data 214 undergoes processing by the concept readiness unit 202 to output a current probability of mastery 228. However, to generate the current probability of mastery 228, the concept readiness unit 202 also needs additional input data. In the illustrative embodiment, the additional input applied to the algorithm includes initial probability of slip and probability of guessing values 213 and a predetermined or previously computed prior 215. The initial values 213 can be provided to the concept readiness unit 202 via the MFD 204, for example, or entered by the user at a user device 206. Alternatively, the initial values 213 can be calculated from the previous assessments and stored in the storage unit. In one embodiment, the prior 215 can be stored in a database or storage device 216 included in or in communication with the concept readiness unit 202.

Furthermore, the system 200 can display the current probability of mastery 228 and/or desired output in a suitable form on a graphic user interface (GUI) 230 at the user device 206. The GUI 230 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 210. Furthermore, in one contemplated embodiment, the probability of mastery information can be transmitted to another computer application, which can perform additional processing on the clusters.

Figure 3:
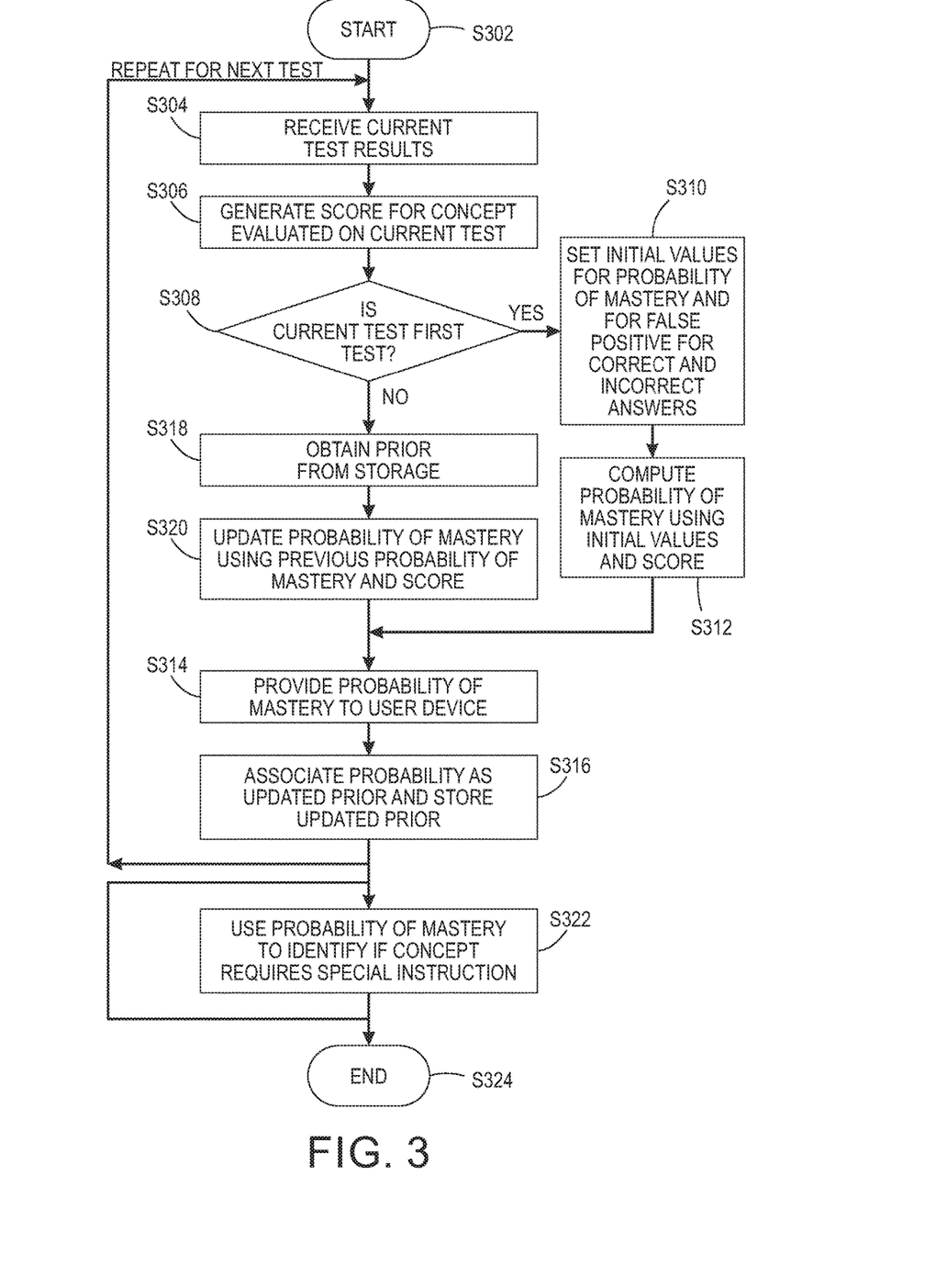
FIG. 3 shows a flow chart illustrating a method for generating and updating a concept mastery estimate according to one embodiment of the present disclosure.

FIG. 3 shows a flow chart illustrating a method 300 for generating and updating the probability of mastery according to one embodiment of the present disclosure. The method starts at S302. At S304, the concept readiness unit 202 receives test results at the test buffer module 218. The test results are received in electronic format and may be received from an MFD 204, a user device 206 or from a workstation of the student who took the test. Certain embodiments contemplate that the student can take the test at a workstation and input each answer via a GUI. Other embodiments contemplate that the student marked an answer sheet for the test, and the MFD scans and transmits the answer sheet to the test buffer module 218, which can extract the answers from the scan copy. In other words, the module 218 retrieves answers to the questions that were administered on the test. The module 218 also retrieves coded information in the test. Particularly, each question on the test can be tagged with information corresponding to the concept or topic being evaluated. The test buffer module 218 can transmit this information to a scoring module 220, which uses this tagged information to identify the questions testing a specific concept. In other words, the same concept is tested using the group of questions. The module 218 generates a score $C_n$ representing a percentage of the questions answered correctly in the group. In other words, a score is generated for each concept evaluated on the current test at S306. Particularly, one aspect of the present disclosure is that a score is generated for each concept instead of a single score being generated for the entire test. In other words, should a test include 150 questions covering five different concepts, five scores are generated—one for each concept. Should such test include 10 questions on a first concept, 20 on a second concept, and so on, only the answers to the former 10 questions are used to compute the score for the first concept; only the answers to the latter 20 questions are used to compute the score to the second concept, and so on. However, one question can cover multiple concepts. Each test is coded with information corresponding to at least one concept being assessed by the each test. Specifically, the test is coded with information corresponding to the one or more concepts being assessed by each question. Using the extracted concept information, the module 218 can compute a score for all questions that assess whether the student has knowledge corresponding to the concept. The scoring module 220 then transmits the scores corresponding to the concepts to the probability of mastery estimation module 222.

For each score, the module 222 applies the score to an algorithm to compute an initial probability or to update the probability of mastery of a corresponding concept. One aspect of the present disclosure is an algorithm that enables the probability to be computed after each test, and which considers historical probability values, i.e., a prior, in the computation to more accurately reflect the probability. To consider the prior, the present disclosure requires that the Bayesian Knowledge Tracing formula be manipulated to account for a concept being tested multiple times.

First, however, the module 222 determines if the current test is the first test received at S308 which tested the concept corresponding to the score. In other words, the module 222 determines if the concept was tested for the first time on the current test. In response to the current test being the first test (YES at S308), the module obtains seed values for applying to the algorithm at S310.

Particularly, the algorithm requires three seed values: (1) an initial probability of mastery $p(M_0)$; (2) an initial probability of slipping $p(S_0)$; and (3) an initial probability of guessing $p(G_0)$. In one embodiment, these values can be identified by a training set, such as the performance of students in a previous group which previously completed, as an illustrative example, the summative assessment. Any known technique can be used for identifying seed values through training sets. Furthermore, the values for $p(S)$ and $p(G)$ can be personalized for each individual student. With sufficient training data, the initial values can be determined to match the individual learner.

In another embodiment, the initial values can be retrieved or determined using the student's scores in a previous class, particularly if the previous and current classes belong to an ordered sequence. In another embodiment, the initial values can be predetermined values that are provided as input by the user. The module 222 can retrieve these values 213 from the storage 216.

These values will likely vary depending on the grade level and specific concept. As an illustrative example only disclosed for the purpose of providing a non-limiting sample for describing the later steps, the initial probability of mastery $p(M_0)$ can be set to 0.5; the initial probability of slipping $p(S_0)$ can be set to 0.05; and the initial probability of guessing $p(G_0)$ can be set to 0.25.

Continuing with FIG. 3 at S312, the module 222 computes the probability of concept mastery $p(M_n)$ using the initial values and the score $C_n$. The module 222 applies the initial values and the score to an algorithm represented by equation (1):

$$p(M_n) = C_n \frac{p(M_{n-1})(1-p(S))}{p(M_{n-1})(1-p(S)) + (1-p(M_{n-1}))p(G)} + (1-C_n)\frac{p(M_{n-1})p(S)}{p(M_{n-1})p(S) + (1-p(M_{n-1}))(1-p(G))} \quad (1)$$

One aspect of the present algorithm is that it considers the false negatives and false positives when computing the probability of mastery. In the conventional approach, the formula, of which the score for only one answer on a test was applied to as input, depended on whether the answer was correct or incorrect. In other words, separate formulas— i.e., Bayesian Knowledge Tracing formulas—were used for correct and incorrect answers. Each answer was applied to the formula, and the values computed for each answer were concatenated to generate a final value representative of the probability of mastery. The presently disclosed algorithm computes a probability for the concept and therefore considers all answers to questions tagged in association with the concept. One benefit of the present approach is that incorrect and correct answers associated with the concept can be considered in one computation for estimating the probability of concept mastery. Unlike computer-based assessments and adaptive assessments, a second benefit of considering all of the answers together is that the exact order of questions assessing a concept on a test need not be known. The module 222 outputs the computed probability of mastery for the current test at S314. At S316, the module 222 also associates the probability as a prior to be considered if and when the probability is updated to reflect the results of a subsequent test. The module 222 stores the prior in a suitable storage location, such as the storage device 213. The reason that the probability is stored as a prior or updated prior is because additional tests can be administered by the user and the scores of any later tests can be used to update the probability of mastery, if the current probability of mastery suggests that the concepts require further instruction time.

One aspect of the present method is that it iteratively updates the probability of mastery after receiving new scores (or evidence) from tests covering the same (i.e., previous) concept until a final set of data is received. As part of the iterative computation performed for the individual student, the system considers the previous probabilities of mastery for the concept. In response to the current test not being the first test (NO at S308), the module 222 obtains the prior (corresponding to the most recent probability) from the storage at S318. The module 222 updates the probability of mastery for the concept at S320 using this new evidence, i.e., the prior and the current score. As disclosed, supra, this current score was computed at S306 from the results of at least the second test.

The module 222 provides the updated probability of mastery to the user device at S314. Again, the module 222 also associates the updated probability as an updated prior to be considered if and when the probability is computed in the future using a new data set. The module 222 stores the updated prior in a suitable storage location, such as the storage device 213. In response to the current test being the last test (YES at S316), the system can optionally use the probability of mastery information to determine if the student requires special instruction for the concept at S322. Any known approach can be used to perform this analysis and/or make this determination. The method ends at S324.

Figure 4:
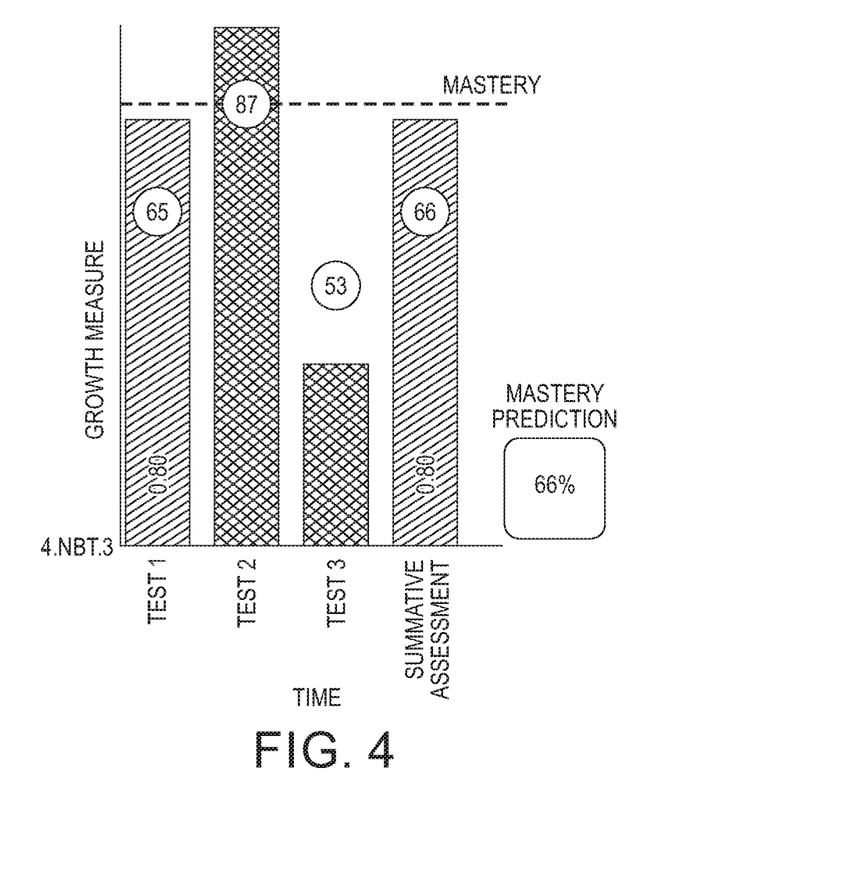
FIG. 4 shows illustrative result of a three-test data set mapped onto a graph.

FIG. 4 shows illustrative result of a sample, three-test data set mapped onto a graph. A bar represents a predetermined mastery threshold. The exact level will be defined by teachers or administrators. For illustrative purposes the mastery threshold is set to 85% of the questions being answered correctly. In other words, mastery is measured by a score on the summative assessment.

The results of four different tests are included in the below Table 1. More specifically, the results correspond to answers to questions in the four tests that cover one common concept. In the illustrative example, the results correspond to tests that were administered to one student.

TABLE 1

|  | Evidence | Probability Mastery 0.50 |
|---|---|---|
| Test 1 | 0.80 | 0.65 |
| Test 2 | 1.00 | 0.87 |
| Test 3 | 0.33 | 0.53 |
| Summative Assessment | 0.80 | 0.66 |

The initial probability of mastery $p(M_0)$ used for the illustrative table is shown to be 0.5, but any number can be applied to the algorithm. As previously disclosed, the initial probability of mastery $p(M_0)$ can be modified based on previous evidence. The initial probability of slipping $p(S_0)$ can be set to 0.05 and the initial probability of guessing $p(G_0)$ can be set to 0.25. In the illustrative table, the student answered 80% of the questions covering the concept correctly on the first test. Each bar in FIG. 4 represents the student's performance on an individual test. Applying this score and values to the algorithm set forth in equation (1), a 65% probability of mastery is computed. In other words, the system estimates a 65% chance or confidence that the student will reach a score of 85% on the summative assessment.

The table reflects that the student answered all of the questions correctly in the second test. Applying the prior value of 65 and the new score of 100% to the algorithm, an updated probability of concept mastery is computed to be 87%. For illustrative purposes, a scenario is shown where the student stumbles and performs much poorer on a third test. In this case, the updated probability of mastery reflects that the student may not have mastered the topic as well as the previous probability suggested. At the same time, the updated probability of mastery considers the student's previous strong performance, as reflected in the prior, and considers this information in computing the update. FIG. 4 illustrates that the student has not mastered the concept preceding a summative assessment. In other words, there is only a 53% chance that the student may master the concept and answer 85% of the questions correctly on the summative assessment.

Table 1 and FIG. 4 both show that the student answered 80% of the questions correctly on the summative assessment. The conventional approach may conclude with 80% confidence that the student has mastered the concept. However, the present system determines that there is rather a 66% confidence that the student has mastered the concept and is ready to advance to the next concept, course or class. The algorithm considers the probability of guesses when computing this value. FIG. 4 enables the user to better view the results over time. As illustrated in FIG. 4, the 80% score on the summative assessment was not sufficient to meet the 85% threshold. As also illustrated in the graph, the probability of mastery computed for the third test, preceding the summative assessment, predicted that the student had not mastered the topic preceding the summative assessment and would not reach the threshold on the summative assessment.

One aspect of the present disclosure is that the algorithm iteratively updates the probability of mastery after teach test to reflect the student's performance on the test.

Another aspect of the present disclosure is that it determines how the student is performing over time. Another aspect is the presently disclosed method and system generates an estimation of mastery and updates the estimation each time the student is assessed on the particular concept. The end result is a collection of mastery estimations for number of concepts—i.e., a probability estimated for each one concept that is assessed. This information can then be used to identify strengths and weaknesses of individual students. Aggregated across classrooms, grades and schools, school systems can use this information to identify groups of students in need of specialized instruction of the concept they are struggling with.

Another aspect of the present approach applying a score for all the questions assessing a concept, the user can start to identify specific patterns—i.e., whether a student understands a concept when the concept is used in a specific way but does not understand the concept when it is combined with a different concept, etc. The present disclosure assists users in diagnosing problems and allows users to better focus the instruction.

Although the control method 300 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 200, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for estimating readiness for passing an associated summative assessment, the method comprising: at a server computer, executing instructions for:

receiving test results via a network device for at least one diagnostic test administered before the associated summative assessment, wherein each test is coded with information corresponding to at least one concept being assessed by the each test;

generating a score $C_n$ of the at least one concept for each of the tests;

using the score $C_n$, generated for a first test, computing a probability of mastery $p(M_n)$ of the at least one concept;

associating the probability of mastery $p(M_n)$ as a prior in a database in communication with a controller;

updating the probability of mastery $p(M_n)$ of the at least one concept for at least a second test using the prior and the score corresponding to the at least a second test wherein the probability of mastery $v(M_n)$ is computed using the following equation:

$$p(M_n) = C_n \frac{p(M_{n-1})(1-p(S))}{p(M_{n-1})(1-p(S))+(1-p(M_{n-1}))p(G)} + (1-C_n)\frac{p(M_{n-1})p(S)}{p(M_{n-1})p(S)+(1-p(M_{n-1}))(1-p(G))}$$

wherein p(S) is a probability that the at least one concept is mastered although a guestion corresponding to the at least one concept was incorrectly answered on the each test; and wherein p(G) is a probability that the at least one concept is not mastered although the question corresponding to the at least one concept was correctly answered on the each test: and providing a user with the probability of mastery $p(M_n)$ at an associated output device.

2. The method of claim 1 further comprising:
iteratively updating the probability of mastery $p(M_n)$ of the each test until the associated summative assessment is administered.

3. The method of claim 1, wherein a separate score $C_n$ is generated for each concept tested on the at least one diagnostic test and wherein each score $C_n$ is computed using answers to questions tagged as being associated with the at least one concept.

4. The method of claim 1 further comprising: determining an initial probability of mastery $p(M_0)$; and
applying the initial probability of mastery $p(M_0)$ to the equation for the computing of the probability of mastery $p(M_n)$ using the score $C_n$ generated for the first test.

5. The method of claim 4, wherein a separate score $C_n$ is generated for each concept tested on the at least one diagnostic test and wherein the score $C_n$ is computed using the answers to questions tagged as being associated with the at least one concept.

6. The method of claim 1 further comprising: determining initial values of p(S) and p(G); and
applying the initial values of p(S) and p(G) to the equation for the computing of the probability of mastery $p(M_n)$ using the score $C_n$ generated for the first test.

7. The method of claim 1, wherein the each test can be selected from a group consisting:
a formative test for assessing a student's readiness for starting instruction for the at least one concept;
a second diagnostic test for assessing the student's progress with the at least one concept following a period of the instruction but allowing for additional instruction;
a final diagnostic test for assessing the student's mastery of the at least one concept, wherein the initial diagnostic test is received at a start of the instruction and the final diagnostic test is received at an end of the instruction but before the associated summative assessment.

8. The method of claim 1 further comprising:
using the probability of mastery $p(M_n)$, determining if the at least one concept requires additional instruction.

9. The method of claim 1, wherein the associated summative assessment is administered at an end of an associated instruction of the at least one concept to determine whether a student has mastered the at least one concept and the probability of mastery predicts how the student will perform on the associated summative assessment.

10. A system for estimating readiness for passing an associated summative assessment, the system comprising:
a processor; and
a non-transitory computer readable memory storing instructions that are executable by the processor to:
receive test results via a network device for at least one diagnostic test administered before the associated summative assessment, wherein each test is coded with information corresponding to at least one concept being assessed by the each test;
generate a score $C_n$ of the at least one concept for each of the tests;
using the score $C_n$ generated for a first test, compute a probability of mastery $p(M_n)$ of the at least one concept;
associate the probability of mastery $p(M_n)$ as a prior;
update the probability of mastery $p(M_n)$ of the at least one concept for at least a second test using the prior and the score $C_n$ corresponding to the at least a second test, wherein the probability of mastery $p(M_n)$ is computed using the following equation:

$$p(M_n) = C_n \frac{p(M_{n-1})(1-p(S))}{p(M_{n-1})(1-p(S))+(1-p(M_{n-1}))p(G)} + (1-C_n)\frac{p(M_{n-1})p(S)}{p(M_{n-1})p(S)+(1-p(M_{n-1}))(1-p(G))}$$

wherein p(S) is a probability that the at least one concept is mastered although a question corresponding to the at least one concept was incorrectly answered on the each test; and wherein p(G) is a probability that the at least one concept is not mastered although the question corresponding to the at least one concept was correctly answered on the each test; and provide a user with the probability of mastery $p(M_n)$ at an associated output device.

11. The system of claim 10, wherein the processor is further adapted to:
iteratively update the probability of mastery $p(M_n)$ of the each test until the associated summative assessment.

12. The system of claim 10, wherein a separate score $C_n$ is generated for each concept tested on the at least one diagnostic test and wherein each score $C_n$ is computed using answers to questions tagged as being associated with the at least one concept.

13. The system of claim 10, wherein the processor is further adapted to:
determining an initial probability of mastery $p(M_0)$; and
applying the initial probability of mastery $p(M_0)$ to the equation for the computing of the probability of mastery $p(M_n)$ using the score $C_n$ generated for the first test.

14. The system of claim 10, wherein the processor is further adapted to:

determining initial values of p(S) and p(G); and applying the initial values of p(S) and p(G) to the equation for the computing of the probability of mastery $p(M_n)$ using the score $C_n$ aenerated for the first test.

15. The system of claim 10, wherein the each test can be selected from a group consisting:

a formative test for assessing a student's readiness for starting instruction for the at least one concept;

a second diagnostic test for assessing the student's progress with the at least one concept following a period of the instruction but allowing for additional instruction;

a final diagnostic test for assessing the student's mastery of the at least one concept, wherein the initial diagnostic test is received at a start of the instruction and the final diagnostic test is received at an end of the instruction but before the associated summative assessment.

16. The system of claim 10, wherein the processor is further adapted to:

using the probability of mastery $p(M_n)$, determine if the at least one concept requires additional instruction.

17. The system of claim 10, wherein the associated summative assessment is administered at an end of an associated instruction of the at least one concept to determine whether a student has mastered the at least one concept and the probability of mastery predicts how the student will perform on the associated summative assessment.

18. A method for estimating readiness for passing a summative assessment, the method comprising:

(a) receiving test results for a test coded with information corresponding to at least one concept being tested on the associated summative assessment;

(b) generating a score $C_n$ corresponding to the at least one concept from the test;

(c) generating a probability of mastery $p(M_n)$ of the at least one concept using the score $C_n$, wherein the current probability of mastery $p(M_n)$ is computed using the following equation:

$$p(M_n) = C_n \frac{p(M_{n-1})(1-p(S))}{p(M_{n-1})(1-p(S))+(1-p(M_{n-1}))p(G)} + (1-C_n)\frac{p(M_{n-1})p(S)}{p(M_{n-1})p(S)+(1-p(M_{n-1}))(1-p(G))}$$

(d) providing the probability of mastery $p(M_n)$ to an associated user device; and (e) repeating (a)-(d) for each subsequent test received before the associated summative assessment;

wherein p(S) is a probability that the at least one concept is mastered although a question corresponding to the at least one concept was incorrectly answered on the test; and wherein p(G) is a probability that the at least one concept is not mastered although the question corresponding to the at least one concept was correctly answered on the test.

* * * * *